United States Patent
Karimli et al.

(10) Patent No.: US 10,863,411 B2
(45) Date of Patent: Dec. 8, 2020

(54) ROUTING COMMUNICATIONS IN DUAL-BAND DEVICES

(71) Applicant: T-Mobile USA, Inc., Bellevue, WA (US)

(72) Inventors: Yasmin Karimli, Kirkland, WA (US); Ming Shan Kwok, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/842,790

(22) Filed: Dec. 14, 2017

(65) Prior Publication Data

US 2018/0376401 A1 Dec. 27, 2018

Related U.S. Application Data

(60) Provisional application No. 62/523,712, filed on Jun. 22, 2017.

(51) Int. Cl.
| | |
|---|---|
| *H04W 40/12* | (2009.01) |
| *H04W 48/18* | (2009.01) |
| *H04W 8/24* | (2009.01) |
| *H04W 88/06* | (2009.01) |
| *H04W 88/08* | (2009.01) |

(52) U.S. Cl.
CPC .............. *H04W 40/12* (2013.01); *H04W 8/24* (2013.01); *H04W 48/18* (2013.01); *H04W 88/06* (2013.01); *H04W 88/08* (2013.01)

(58) Field of Classification Search
CPC .................................................. H04W 40/12
See application file for complete search history.

(56) References Cited

U.S. PATENT DOCUMENTS

| | | | |
|---|---|---|---|
| 9,749,884 B1 * | 8/2017 | Cummings | H04L 43/045 |
| 10,045,287 B1 * | 8/2018 | Kavuri | H04W 48/18 |
| 10,314,045 B2 * | 6/2019 | Wu | H04W 72/048 |
| 10,524,277 B2 * | 12/2019 | Kubota | H04W 36/04 |

(Continued)

FOREIGN PATENT DOCUMENTS

WO  WO2017034230  3/2017

OTHER PUBLICATIONS

The PCT Search Report and Written Opinion dated Sep. 5, 2018, for PCT Application No. PCT/US18/33977, 14 pages.

*Primary Examiner* — Parth Patel
(74) *Attorney, Agent, or Firm* — Lee & Hayes, P.C.

(57) ABSTRACT

Routing data transmissions in dual-band devices is described. In an example, a system can determine, based at least in part on capabilities information associated with a device, two or more networks that are available to the device. The two or more networks can include at least a fourth generation (4G) network and a fifth generation (5G) network. The device can be anchored in a first network of the two or more networks. The system can determine first characteristic(s) associated with the first network and second characteristic(s) associated with a second network of the two or more networks. Based at least in part on the first characteristic(s) and the second characteristic(s), the device can determine to transmit data via the second network instead of the first network and can transmit the data via the second network. The system can be associated with a service provider or the device.

20 Claims, 6 Drawing Sheets

(56) References Cited

U.S. PATENT DOCUMENTS

| | | | |
|---|---|---|---|
| 2005/0066033 A1* | 3/2005 | Cheston | H04L 29/06 709/225 |
| 2006/0166660 A1* | 7/2006 | Ciak | H04W 48/18 455/418 |
| 2009/0067628 A1 | 3/2009 | Pudney et al. | |
| 2013/0078995 A1* | 3/2013 | Jouin | G06F 3/1438 455/426.1 |
| 2014/0094185 A1* | 4/2014 | Yiu | H04W 4/70 455/453 |
| 2015/0222697 A1* | 8/2015 | Bassiouny | H04L 67/1002 709/203 |
| 2016/0065480 A1* | 3/2016 | Faccin | H04L 47/20 370/235 |
| 2016/0095108 A1 | 3/2016 | Ryoo et al. | |
| 2016/0112908 A1* | 4/2016 | Chin | H04W 36/0088 455/436 |
| 2016/0127945 A1* | 5/2016 | Cui | H04W 28/0247 370/329 |
| 2017/0085494 A1 | 3/2017 | Park et al. | |
| 2017/0118689 A1* | 4/2017 | Zhang | H04W 48/18 |
| 2017/0164135 A1* | 6/2017 | Kodaypak | H04W 4/70 |
| 2017/0230873 A1* | 8/2017 | Baek | H04W 36/0011 |
| 2018/0006931 A1* | 1/2018 | Ellis | H04L 1/0018 |
| 2018/0020386 A1* | 1/2018 | Chandramouli | H04W 36/0027 |
| 2018/0020418 A1* | 1/2018 | Chandramouli | H04W 16/14 |
| 2018/0054800 A1* | 2/2018 | Yeo | H04L 5/0035 |
| 2018/0103403 A1* | 4/2018 | Van Lieshout | H04W 36/14 |
| 2018/0115891 A1* | 4/2018 | Kim | H04L 61/1588 |
| 2018/0332313 A1* | 11/2018 | Wellbrock | H04N 21/2225 |
| 2018/0332659 A1* | 11/2018 | Hwang | H04W 24/02 |
| 2018/0359672 A1* | 12/2018 | Keller | H04W 36/14 |
| 2019/0007874 A1* | 1/2019 | Mildh | H04W 48/12 |
| 2019/0053144 A1* | 2/2019 | Subramani | H04B 17/102 |
| 2019/0230497 A1* | 7/2019 | Ljung | H04W 8/22 |
| 2020/0015306 A1* | 1/2020 | Breuer | H04W 72/042 |

\* cited by examiner

200 ↘

```
┌─────────────────────────────────────────────────────────────┐
│ DETERMINE, BASED AT LEAST IN PART ON CAPABILITIES INFORMATION│
│   ASSOCIATED WITH A DEVICE, TWO OR MORE NETWORKS THAT ARE   │
│  AVAILABLE TO THE DEVICE, THE TWO OR MORE NETWORKS INCLUDING │
│              A 4G NETWORK AND A 5G NETWORK                  │
│                            202                              │
└─────────────────────────────────────────────────────────────┘
                              ↓
┌─────────────────────────────────────────────────────────────┐
│    DETERMINE FIRST CHARACTERISTIC(S) ASSOCIATED WITH A FIRST │
│            NETWORK OF THE TWO OR MORE NETWORKS              │
│                            204                              │
└─────────────────────────────────────────────────────────────┘
                              ↓
┌─────────────────────────────────────────────────────────────┐
│  DETERMINE SECOND CHARACTERISTIC(S) ASSOCIATED WITH A SECOND │
│            NETWORK OF THE TWO OR MORE NETWORKS              │
│                            206                              │
└─────────────────────────────────────────────────────────────┘
                              ↓
┌─────────────────────────────────────────────────────────────┐
│  ROUTE ONE OR MORE DATA TRANSMISSIONS VIA THE FIRST NETWORK │
│  OR THE SECOND NETWORK BASED AT LEAST IN PART ON THE FIRST  │
│   CHARACTERISTIC(S) AND/OR THE SECOND CHARACTERISTIC(S)     │
│                            208                              │
└─────────────────────────────────────────────────────────────┘
```

ROUTING COMMUNICATIONS IN DUAL-BAND DEVICES

PRIORITY APPLICATION

This application claims the benefit of U.S. Provisional Application No. 62/523,712, filed on Jun. 22, 2017, the entire contents of which are incorporated herein by reference.

BACKGROUND

In wireless networking, multi-band network equipment is capable of transmitting in two or more different standard frequency ranges (e.g., bands). For instance, many home wireless (unlicensed) networks feature dual-band broadband routers that support both 2.4 Gigahertz and 5 Gigahertz channels. Similar to multi-band wireless network equipment, some mobile devices are also capable of using two or more bands for transmitting communications via networks. Such multi-band mobile devices can enable communication transmissions via multiple cellular (licensed) and/or wireless (unlicensed) networks. For instance, a mobile device can have a radio that supports third generation broadband cellular network technology ("3G") and a radio that supports fourth generation broadband cellular network technology ("4G"). Or, a mobile device can have a radio supporting a cellular technology and a radio supporting wireless technology.

4G is an internet protocol (IP) based technology with a capacity of 100 Megabits per second to 1 Gigabit per second. 4G technology delivers high quality, high speed, and high capacity (generally at low service costs). 4G technology is used for voice, multimedia, and internet over IP based data transmissions. Additional details associated with 4G technologies can be found in the International Mobile Telecommunications Advanced (IMT-Advanced) specification specified by the International Telecommunications Union-Radio (ITR-U).

The fifth generation of broadband cellular network technology ("5G") is not currently defined by any standards organization. 5G technology has more capacity than 4G technology, supporting multiple (e.g., up to 35) Gigabits per second. 5G technology has the potential to deliver higher quality, higher speed, and higher capacity (at even lower costs) than 4G technology. Additionally, 5G technology has significantly lower latency than 4G technology, enabling faster load times. 5G technology can support voice, multimedia, and internet over IP based data transmissions, as well as supporting internet connected devices (Internet of Things), autonomous vehicles, virtual and/or augmented reality advancements, and additional and/or alternative use cases.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 2 illustrates an example process for routing data transmissions via networks supporting different cellular technologies.

DETAILED DESCRIPTION

Figure 1:
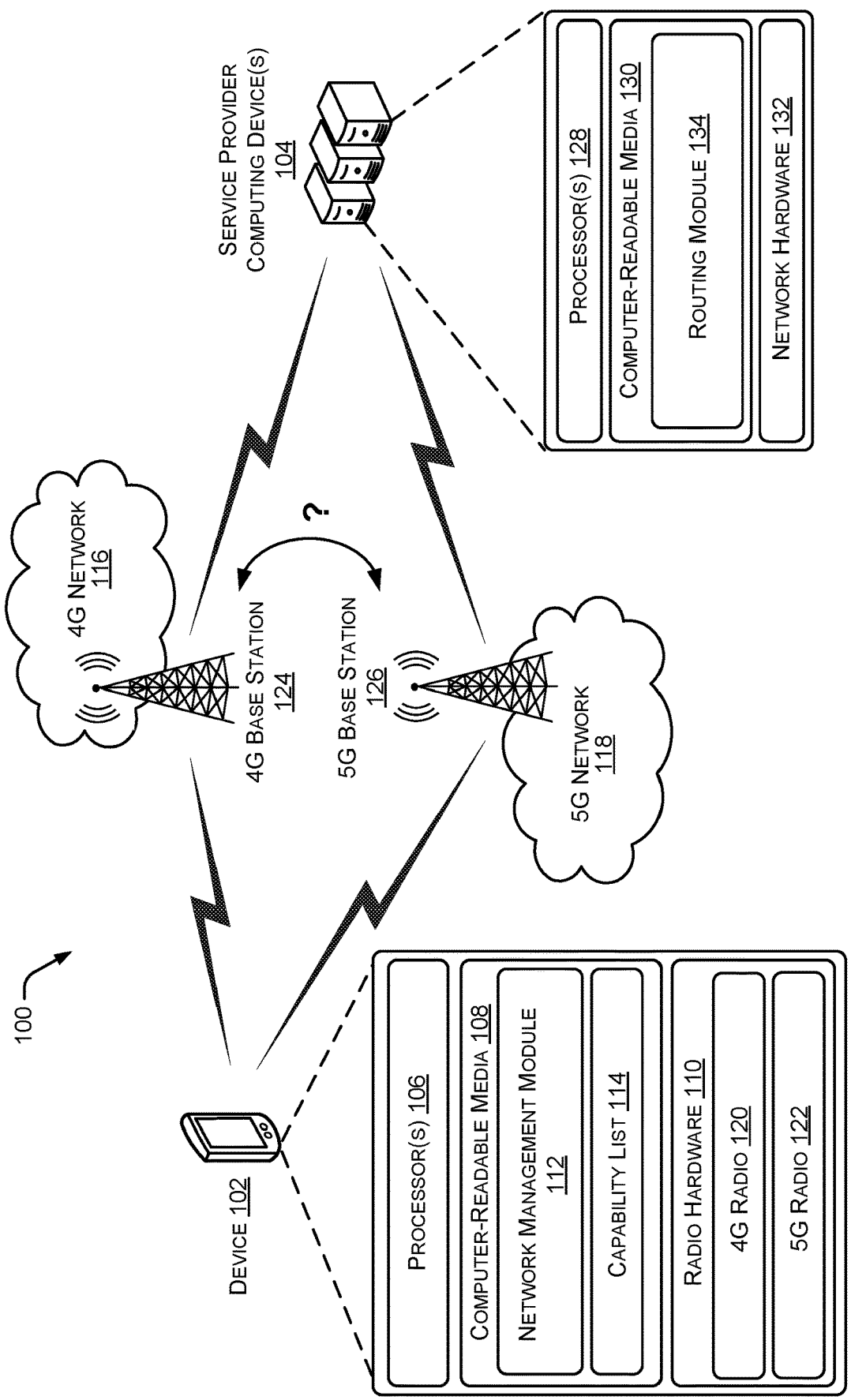
FIG. 1 illustrates a system for routing data transmissions via networks supporting different cellular technologies.

This disclosure describes routing data transmissions in dual-band devices. In wireless networking, multi-band network equipment is capable of transmitting in two or more different standard frequency ranges (e.g., bands). As described above, some mobile devices are also capable of using two or more bands for transmitting communications via networks. Such multi-band mobile devices can enable communication transmissions via multiple cellular (licensed) and/or wireless (unlicensed) networks. For instance, a mobile device can have a radio that supports third generation broadband cellular network technology ("3G") and a radio that supports fourth generation broadband cellular network technology ("4G"). Or, a mobile device can have a radio supporting a cellular technology and a radio supporting wireless technology.

4G is an internet protocol (IP) based technology with a capacity of 100 Megabits per second to 1 Gigabit per second. 4G technology delivers high quality, high speed, and high capacity (generally at low service costs). 4G technology is used for voice, multimedia, and internet over IP based data transmissions. Additional details associated with 4G technologies can be found in the International Mobile Telecommunications Advanced (IMT-Advanced) specification specified by the International Telecommunications Union-Radio (ITR-U).

The fifth generation of broadband cellular network technology ("5G") is not currently defined by any standards organization, as described above. 5G technology has more capacity than 4G technology, supporting multiple (e.g., up to 35) Gigabits per second. 5G technology has the potential to deliver higher quality, higher speed, and higher capacity (at even lower costs) than 4G technology. Additionally, 5G technology has significantly lower latency than 5G technology, enabling faster load times. 5G technology can support voice, multimedia, and internet over IP based data transmissions, as well as supporting internet connected devices (Internet of Things), autonomous vehicles, virtual and/or augmented reality advancements, and additional and/or alternative use cases.

Techniques described herein are directed to routing data transmissions (e.g., communications) between different cellular technologies. In at least one example, a mobile device can include at least two radios supporting at least two different cellular technologies. For instance, a mobile device can include a first radio supporting 4G technology and a second radio supporting 5G technology. For the purpose of this discussion, such a mobile device can be called a "dual-band device." However, it should be noted that a dual-band device can additionally and/or alternatively include fewer bands or more bands (e.g., a single-band device or a multi-band device). Techniques described herein are directed to determining when to anchor such a dual-band device in a particular cellular technology, and when to route some data transmissions to the alternative cellular technology. In at least one example, uplink communications can be routed by devices sending the data transmissions and downlink data transmissions can be routed by computing device (s) associated with a service provider (e.g., via a scheduler associated with a base station).

In at least one example, a device can anchor in a particular cellular technology and can use other cellular technologies for individual services (e.g., data transmission(s) associated with particular application(s), etc.). In some examples, such as when the device is anchored in 4G technology, the device can determine which network to use for transmitting data based on a scheduling algorithm that considers characteristics of one or more available networks. Characteristics of an available network can be associated with a Quality of Service (QoS) definition, which can include latency, packet error rate, guaranteed bitrate, etc. In an example, a device can analyze characteristics associated with a 4G cellular network and characteristics associated with a 5G cellular network and can determine to route data associated with a particular application to the 4G cellular network or the 5G cellular network based on determining which network provides the best user experience. That is, the scheduling algorithm can evaluate the relevant characteristics (e.g., associated with QoS) to determine which network provides the highest throughput, lowest latency, and/or minimal variance, and can route data through such a network. In some examples, different applications can have different network requirements. In such examples, the scheduling algorithm can evaluate the relevant characteristics in view of the network requirements for a particular application. As a non-limiting example, an augmented reality (AR) application can require low latency, but may not have a requirement for (high) throughput. In such an example, the scheduling algorithm on the device can determine that the 5G cellular network is associated with lower latency than the 4G cellular network (e.g., the 5G cellular network can transmit data faster than the 4G cellular network) and can route data associated with the AR application via the 5G cellular network.

In other examples, such as when the device is anchored in 5G technology, the device can utilize pre-provisioned routing rule(s) (e.g., by a service provider, etc.) to determine which network to route data associated with a particular application. For instance, in a non-limiting example, if the pre-provisioned routing rule(s) indicate that data associated with an AR application is to be routed through the 5G cellular network when congestion associated with the 5G cellular network is below a threshold, then the device can decide to route AR data through the 5G cellular network when the congestion associated with the 5G cellular network is below the threshold. In such an example, other data that is not identified in the pre-provisioned routing rule(s) can be evenly routed between the 4G cellular network and the 5G cellular network.

In yet another example, such as when the device is anchored in 5G technology, the device can analyze characteristic(s) (e.g., based on QoS) associated with each of the available network(s) to determine data flow associated with each of the available network(s). The device can determine how to route data based on the analyzed data flow. For instance, the device can analyze relevant characteristic(s) to determine which network is likely to provide the best user experience and can route data through such a network. As a non-limiting example, the device can determine that data associated with real-time conversation is to be routed through a 4G cellular network based on data flow associated with the 4G cellular network.

In additional and/or alternative examples, computing device(s) associated with a service provider can determine how to route data between two or more available networks. As described above, the computing device(s) associated with the service provider can determining how to route downlink data transmission(s). In at least one example, the computing device(s) associated with the service provider can analyze characteristic(s) (e.g., based on QoS) associated with each of the available network(s) to determine data flow associated with each of the available network(s). The computing device(s) can determine how to route data based on the analyzed data flow. For instance, the computing device(s) can analyze relevant characteristic(s) to determine which network is likely to provide the best user experience and can route data through such network. As a non-limiting example, the 5G cellular network can have better throughput (600 Mbps) than the 4G cellular network (300 Mbps). Accordingly, the computing device(s) can route more data through the 5G cellular network than the 4G cellular network.

FIG. 1 illustrates a system 100 for routing data transmissions (e.g., communications) via networks supporting different cellular technologies. In at least one example, the environment 100 can include a device 102 that is in communication with one or more service provider computing devices 104. The service provider computing device(s) 104 can be associated with a service provider providing telecommunication services, content services, etc. In at least one example, the device 102 can be configured to support at least 4G cellular technology and 5G cellular technology. That is, the device 102 can be a dual-band device. While only one device is illustrated in FIG. 1, in additional and/or alternative examples, any number of devices can be in communication with the service provider computing device(s) 104.

In at least one example, the device 102 can correspond to user equipment (UE) including, but not limited to, a smart phone, a personal digital assistant, a netbook, a laptop computer, a smart appliance, and/or another electronic device that is capable of transmitting or receiving audio, video, and/or data via the network(s) (e.g., cellular network(s), wireless network(s), etc.). In at least one example, the device 102 can include processor(s) 106, computer-readable media 108, and radio hardware 110. The processor(s) 106 can represent, for example, a central processing unit (CPU)-type processing unit, a graphics processing unit (GPU)-type processing unit, a Field-Programmable Gate Array (FPGA), another class of Digital Signal Processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc. In at least one example, an accelerator can represent a hybrid device, such as one from ZYLEX or ALTERA that includes a CPU course embedded in an FPGA fabric. In various embodiments, the processor(s) 106 can execute one or more modules and/or processes to cause the device 102 to perform a variety of functionalities, as set forth above and explained in further detail in the following disclosure. Additionally, each of the processor(s) 106 can possess its own local memory, which also can store program modules, program data, and/or one or more operating systems.

Depending on the exact configuration and type of the device 102, the computer-readable media 108, can include computer storage media and/or communication media.

Computer storage media can include volatile memory, nonvolatile memory, and/or other persistent and/or auxiliary computer storage media, removable and non-removable computer storage media implemented in any method or technology for storage of information such as computer readable instructions, data structures, program modules, or other data. Computer memory is an example of computer storage media. Thus, computer storage media includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disk read-only memory (CD-ROM), digital versatile disks (DVDs), optical cards or other optical storage media, miniature hard drives, memory cards, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In at least one example, the computer storage media can include non-transitory computer-readable media. Non-transitory computer-readable media can include volatile and nonvolatile, removable and non-removable tangible, physical media implemented in technology for storage of information, such as computer readable instructions, data structures, program modules, or other data. The computer-readable media 108 is an example of non-transitory computer-readable media. Non-transitory computer-readable media include, but are not limited to, RAM, ROM, EEPROM, flash memory or other memory technology, CD-ROM, DVDs or other optical storage, magnetic cassettes, magnetic tape, magnetic disk storage or other magnetic storage devices, or any other tangible, physical medium which can be used to store the desired information and which can be accessed by the device 102. Any such non-transitory computer-readable media can be part of the device 102.

In contrast, communication media includes computer readable instructions, data structures, program modules, or other data in a modulated data signal, such as a carrier wave, or other transmission mechanism. As defined herein, computer storage media does not include communication media.

The computer-readable media 108 can include one or more modules and data structures including, for example, a network management module 112. Additionally, in at least one example, the computer-readable media 108 can include a capability list 114 that can be accessible to the radio hardware 110. The one or more modules and data structures can be in the form of stand-alone applications, productivity applications, an operating system component, or any other application or software module configured to facilitate intelligent network routing, as described herein.

The network management module 112 can be configured to manage network connections on behalf of the device 102. In at least one example, at least two networks can be available to the device 102. For instance, as illustrated in FIG. 1, a 4G cellular network 116 associated with 4G technology can be available to the device 102 and a 5G cellular network 118 associated with 5G technology can be available to the device 102 (based on radio hardware 110 associated with the device 102). Additional and/or alternative networks (e.g., 2G cellular network, 3G cellular network, Wi-Fi network, etc.) can be available to the device 102, despite not being pictured in FIG. 1.

In at least one example, the network management module 112 can determine which network, of the available networks, to anchor the device 102. In at least one example, network anchoring causes control and management flows associated with data transmissions to go through the network to which the device 102 is anchored. That is, when the network connectivity of the network to which the device 102 is anchored is lost, the device 102 may lose all services despite other network(s) that may be available to the device 102.

In at least one example, the network management module 112 can send capabilities information (e.g., associated with the capabilities list 114 described below) to the service provider computing device(s) 104. In some examples, the network management module 112 can send capabilities information to the service provider computing device(s) 104 when the device 102 initiates a communication via the network(s) and/or after the device 102 moves from a first cell to a second cell in one or more networks. Responsive to sending the capabilities information, the network management module 112 can receive, for instance from the service provider computing device(s) 104, an indication of cellular technologies supported by the service provider.

In at least one example, a network management module 112 can anchor the device 102 in a particular cellular technology based on which cellular technology is supported by the service provider. As an example, if the device 102 supports both 4G technology and 5G technology, and the service provider primarily supports 5G technology, then the network management module 112 can determine to anchor the device 102 in 5G technology (e.g., the 5G cellular network 118). Or, if the device 102 supports both 4G technology and 5G technology, the network management module 112 can determine to anchor the device 102 in a highest performing cellular technology.

In addition to determining which cellular technology to anchor the device 102, the network management module 112 can determine whether to use other cellular technologies for individual services (e.g., data transmission(s) associated with particular application(s), etc.). In some examples, such as when the device 102 is anchored in 4G technology (e.g., the 4G cellular network 116), the network management module 112 can determine which network to use for transmitting data based on a scheduling algorithm that considers characteristics of one or more available networks. Characteristics of an available network can be associated with a QoS definition, which can include latency, packet error rate, guaranteed bitrate, etc. For instance, in an example, a network management module 112 can analyze characteristics associated with a 4G cellular network 116 and characteristics associated with a 5G cellular network 118 and can determine to route data associated with a particular application to the 4G cellular network 116 or the 5G cellular network 118.

In other examples, such as when the device 102 is anchored in 5G technology (e.g., the 5G cellular network 118), the network management module 112 can utilize pre-provisioned routing rule(s) to determine which network to route data associated with a particular application. In at least one example, the pre-provisioned routing rule(s) indicate through which network data associated with individual applications is to be routed. The pre-provisioned routing rule(s) can be updated as new application(s) are downloaded and/or otherwise associated with the device 102. In at least one example, data associated with applications that are not identified in the pre-provisioned routing rule(s) can be evenly routed between the available networks.

In an additional and/or alternative example, when the device 102 is anchored in 5G technology, the network management module 112 can analyze characteristic(s) (e.g., based on QoS) associated with each of the available network(s) to determine data flow associated with each of the available network(s). The network management module 112 can determine how to route data based on the analyzed data flow. For instance, the network management module 112 can analyze relevant characteristic(s) to determine which network is likely to provide the best user experience and can route data through such network. In at least one example, the network management module 112 can perform deep packet inspection to determine how to route data via one or more available networks. For instance, the network management module 112 can perform deep packet inspection to examine certain packet behavior (e.g., streaming data versus bit torrent data download or web surfing data) and can route data based on the packet association.

In some examples, the network management module 112 can determine which network to route data transmissions through, as described above. In at least one example, the network management module 112 can determine through which network outgoing data transmissions (e.g., uplink transmissions) are to be routed and a routing mechanism associated with the service provider can determine through which network incoming data transmissions (e.g., downlink transmissions) are to be routed. For instance, in at least one example, a routing mechanism located at a base station of a network and/or the service provider computing device(s) 104 can determine which network incoming data transmissions are to be routed.

The capability list 114 can store UE capabilities associated with the device 102. The capability list 114 can include information including, but not limited to, UE-category (which can indicate physical (PHY) layer throughput), feature group indicator(s) (which can indicate radio protocol aspects), carrier aggregation band combination (which can indicate combinations of operating bands and capacity classes), supported radio bands (e.g., 4G, 5G, etc.), etc. As new cellular technologies are released, additional and/or alternative features can be added to the capability list 114.

The radio hardware 110 provides wireless UE capabilities, such as connecting to a base station associated with a cellular network, a Wi-Fi network, or other wireless networks. The radio hardware 110 can include or be incorporated into processors, ASICs, programmable circuits such as FPGAs, or in other ways. In at least one example, the radio hardware 110 can include a 4G radio 120 and a 5G radio 122. In at least one example, the 4G radio 120 supports 4G technology and the 5G radio 122 supports 5G technology. That is, the 4G radio 120 can connect to the 4G base station 124 and the 5G radio 122 can connect to the 5G base station 126. In alternative examples, the radio hardware 110 may only include the 4G radio 120 or the 5G radio 122, or may include additional radio(s), such as a Wi-Fi radio, a 3G radio, etc.

As described above, the radio hardware 110 can enable the device 102 to connect to a base station associated with a cellular network, a Wi-Fi network, or other wireless networks. In at least one example, the system 100 can include a 4G base station 124 and a 5G base station 126. Base stations (also known as cell sites or cell towers) can be associated with antennae and other electronic communications equipment (e.g., transceivers, digital signal processors, control electronics, a GPS receiver, etc.) to create a cell in a cellular network. In at least one example, the 4G base station 124 can be associated with 4G cellular technology (e.g., can be used to create a cell in the 4G cellular network 116) and the 5G base station 126 can be associated with 5G cellular technology (e.g., can be used to create a cell in a 5G cellular network 118).

As illustrated in FIG. 1, the device 102 can communicate with the service provider computing device(s) 104 via the 4G cellular network 122 and/or the 5G cellular network 124. Additionally and/or alternatively, the device 102 can communicate with the service provider computing device(s) 104 via a wireless network or other cellular network (e.g., 2G, 3G, etc.). The service provider computing device(s) 104 can be any type of server, such as a network-accessible server. In some examples, the service provider computing device(s) 104 can be stand-alone computing systems, distributed-computing systems, networked-computing systems, etc. For instance, in at least one example, one or more of the functionalities described herein as being performed by the server(s) can be performed by a single device or multiple devices. In some examples, one or more of the functionalities described herein can be performed by the device 102 instead of, or in addition to, the service provider computing device(s) 104. In additional and/or alternative examples, one or more of the functionalities described herein can be performed by computing device(s) associated with the base stations (e.g., 4G base station 124 or 5G base station 126) instead of, or in addition to, the service provider computing device(s) 104.

In various examples, each of the service provider computing device(s) 104 can be associated with one or more processors 128, computer-readable media 130, and network hardware 132. The processors 128 can have the same and/or similar structure and/or function as the processor(s) 106, described above.

Depending on the exact configuration and type of the service provider computing device(s) 104, the computer-readable media 130 can include computer storage media and/or communication media. The computer-readable media 130 can have the same and/or similar structure and/or function as the computer-readable media 108, described above. The computer-readable media 130 can include one or more modules and data structures including, for example, a routing module 134. The one or more modules and data structures can be in the form of stand-alone applications, productivity applications, an operating system component, or any other application or software module for facilitating intelligent network routing, as described herein.

The routing module 134 can be configured to determine how to route communications when a device, such as device 102, is capable of utilizing both the 4G cellular network 122 and the 5G cellular network 124. In at least one example, the routing module 134 can receive capabilities information from the device 102. In some examples, as described above, the device 102 can send capabilities information to the service provider computing device(s) 104 when the device 102 initiates a communication via the network(s) and/or after the device 102 moves from a first cell to a second cell in one or more networks. Responsive to receiving the capabilities information, the routing module 134 can send an indication of cellular technologies supported by the service provider to the device 102.

In at least one example, based at least in part on the capabilities information associated with the device 102, the routing module 134 can determine how to route data between two or more networks that are available to the device 102 (and supported by the service provider). In at least one example, the routing module 134 can analyze characteristic(s) (e.g., based on QoS) associated with each of the available network(s) to determine data flow associated with each of the available network(s). The routing module 134 can determine how to route data based on the analyzed data flow. For instance, routing module 134 can analyze relevant characteristic(s) to determine which network is likely to provide the best user experience and can route data through such network.

The network hardware 132 can provide wired or wireless networking capabilities to the service provider computing device(s) 104. The network hardware 132 can include or be incorporated into processors, ASICs, programmable circuits such as FPGAs, or in other ways.

Figure 3A:
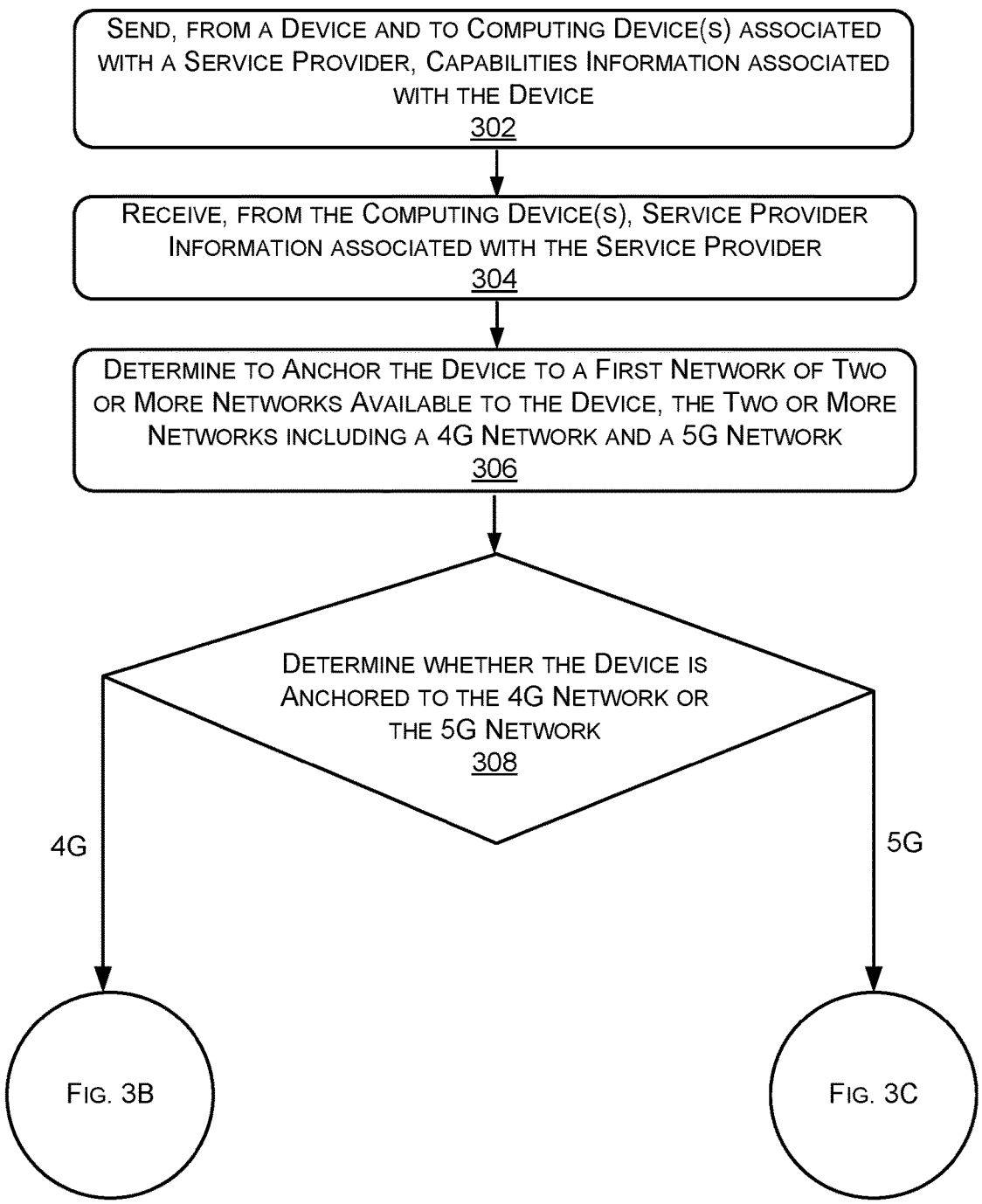
FIGS. 3A-3C illustrate an example process for routing data transmissions via networks supporting different cellular technologies, from the perspective of a device.
Figure 3B:
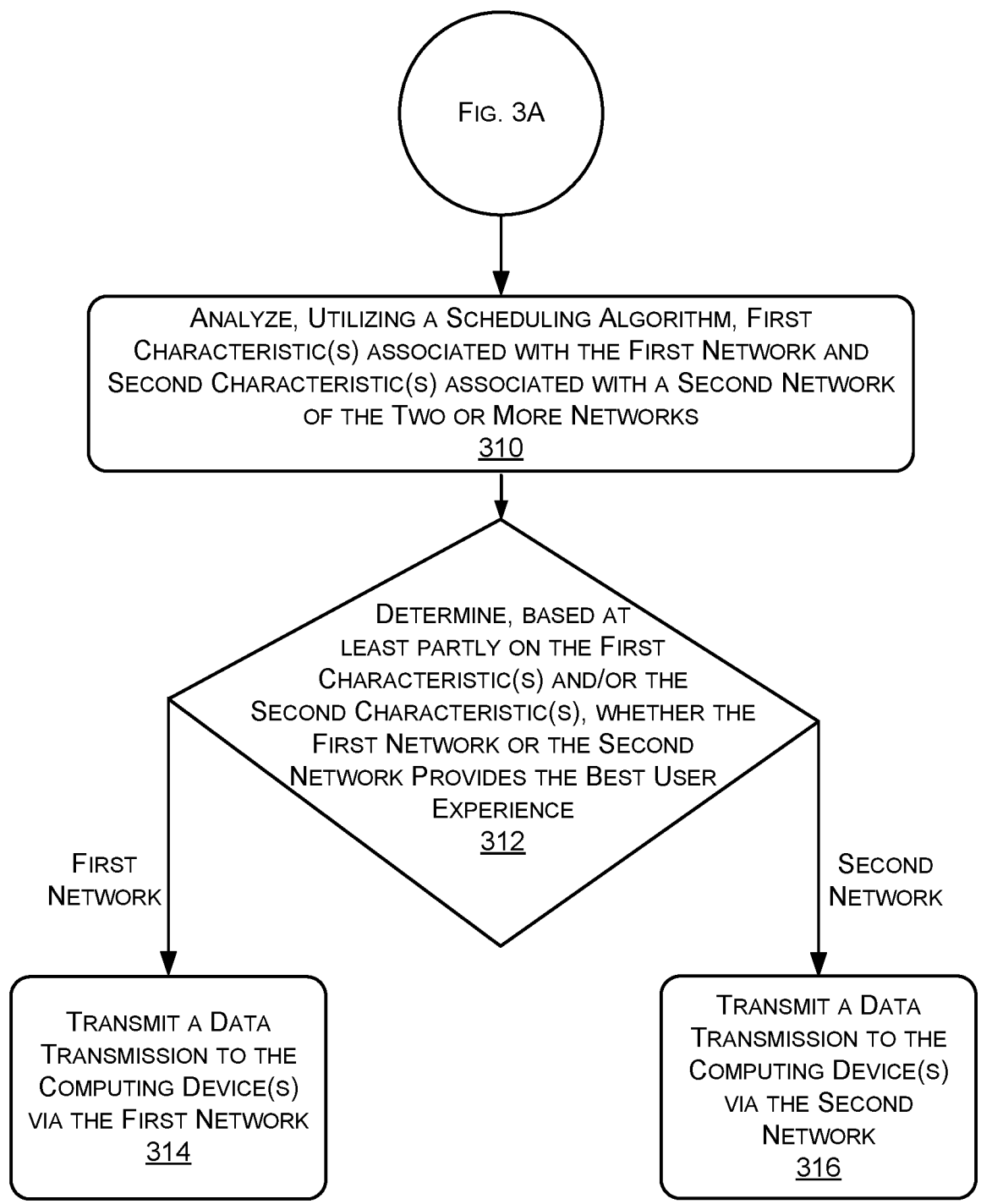
Figure 3C:
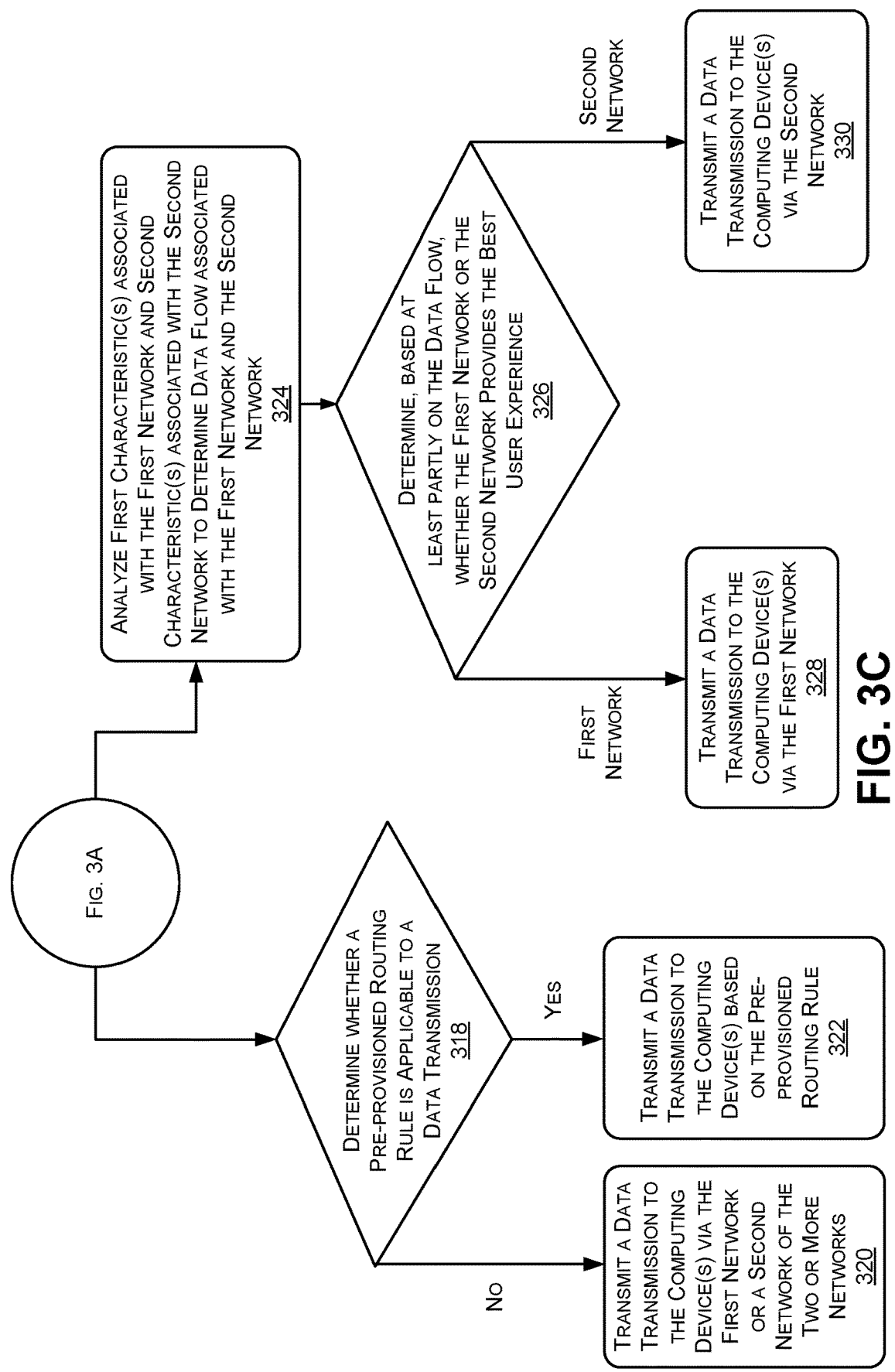
Figure 4:
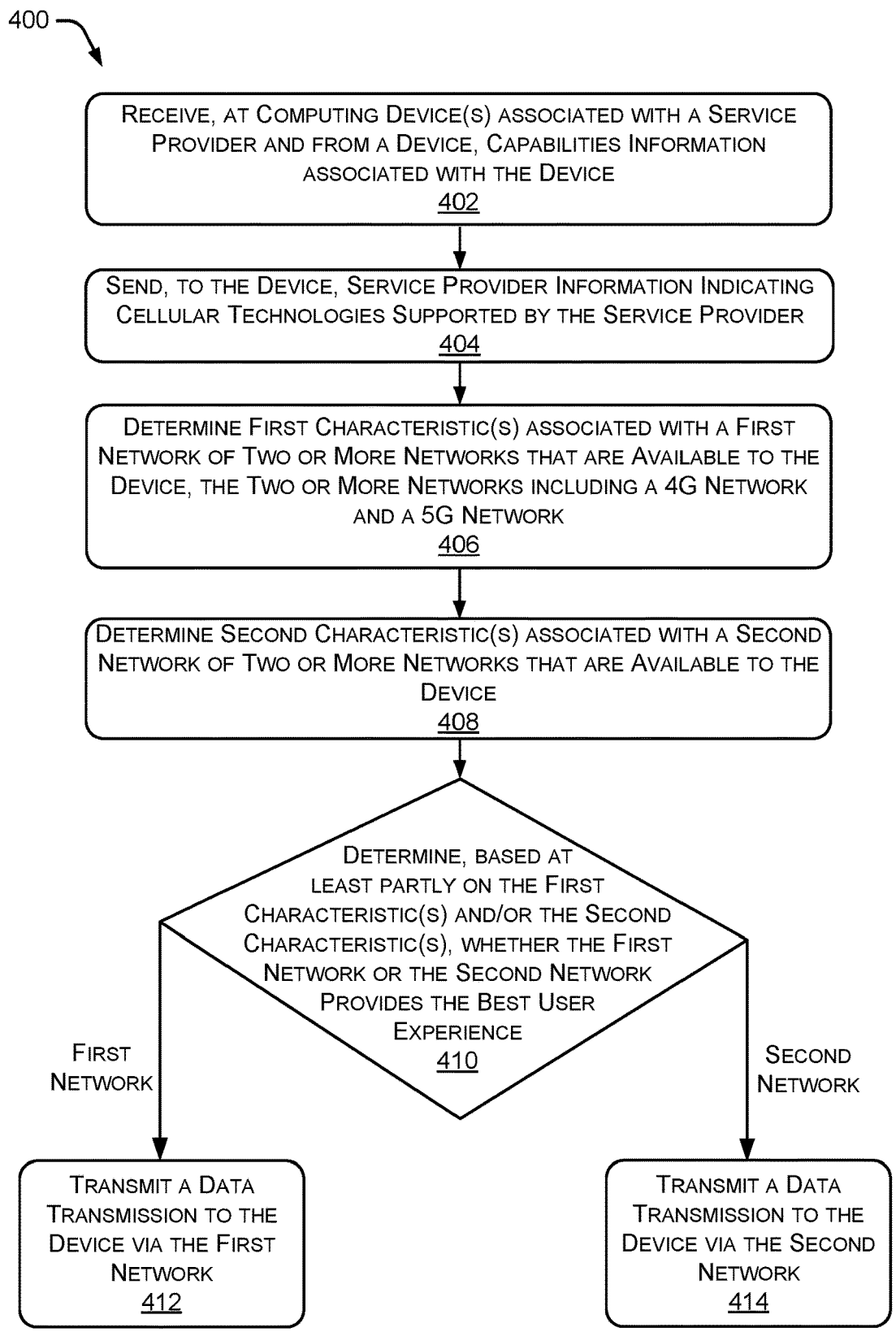
FIG. 4 illustrates an example process for routing data transmissions via networks supporting different cellular technologies, from the perspective of one or more servers.

FIGS. 2-4 describe example processes for routing data transmissions (e.g., communications) in dual-band devices. The example processes are described in the context of the system of FIG. 1, but are not limited to that environment.

The processes described above in association with FIG. 2-4 can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functionalities or implement particular abstract data types. In other embodiments, hardware components perform one or more of the operations. Such hardware components can include or be incorporated into processors, ASICs, programmable circuits such as FPGAs, or in other ways. The order in which the operations are described is not intended to be construed as a limitation, and any number of the described operations and/or processes can be combined in any order and/or in parallel to implement the processes.

FIG. 2 illustrates an example process 200 for routing data transmissions via networks supporting different cellular technologies.

Block 202 illustrates determining, based at least in part on capabilities information associated with a device, two or more networks that are available to the device, the two or more networks including a 4G cellular network and a 5G cellular network. As described above, the capability list 114 can store UE capabilities associated with the device 102. The capability list 114 can include information including, but not limited to, UE-category (which can indicate physical (PHY) layer throughput), feature group indicator(s) (which can indicate radio protocol aspects), carrier aggregation band combination (which can indicate combinations of operating bands and capacity classes), supported radio bands (e.g., 4G, 5G, etc.), etc. In the context of device 102, the capabilities information can indicate that the device 102 supports 4G technology and 5G technology.

In at least one example, the network management module 112 can send capabilities information (e.g., associated with the capabilities list 114 described below) to the service provider computing device(s) 104. In some examples, the network management module 112 can send capabilities information to the service provider computing device(s) 104 when the device 102 initiates a communication via the network(s) and/or after the device 102 moves from a first cell to a second cell in one or more networks. The routing module 134 can receive the capabilities information and can send service provider information to the device 102. The service provider information can indicate which cellular technologies are supported by the service provider. That is, responsive to sending the capabilities information, the network management module 112 can receive, for instance from the service provider computing device(s) 104, an indication of cellular technologies supported by the service provider. In at least one example, the device 102 can anchor in one of the cellular technologies.

Block 204 illustrates determining first characteristic(s) associated with a first network of the two or more networks. In at least one example, the network management module 112 and/or the routing module 134 can determine characteristic(s) associated with the first network. For instance, the network management module 112 and/or the routing module 134 can determine the QoS associated with the first network.

Block 206 illustrates determining second characteristic(s) associated with a second network of the two or more networks. In at least one example, the network management module 112 and/or the routing module 134 can determine characteristic(s) associated with the second network. For instance, the network management module 112 and/or the routing module 134 can determine the QoS associated with the second network.

Block 208 illustrates routing one or more data transmissions via the first network or the second network based at least in part on the first characteristic(s) and/or the second characteristic(s). As described above, the network management module 112 and/or the routing module 134 can route data transmissions via the first network and the second network. In some examples, the network management module 112 can determine how to route data transmissions based on which network (e.g., the first network or the second network) the device 102 is anchored. Additional details associated with routing data transmission(s) via the device 102 are described below with reference to FIGS. 3A-3C. In additional and/or alternative examples, the routing module 134 can route data transmissions(s) based on the first characteristic(s) and/or the second characteristic(s). Additional details associated with routing data transmission(s) via the service provider computing device(s) 104 are described below with reference to FIG. 4.

In at least one example, the network management module 112 can determine through which network outgoing data transmissions (e.g., uplink transmissions) are to be routed and the routing module 134 can determine through which network incoming data transmissions (e.g., downlink transmissions) are to be routed. For instance, in at least one example, the routing module 134, which can be located at a base station of a network and/or the service provider computing device(s) 104, can determine which network incoming data transmissions are to be routed.

FIGS. 3A-3C illustrate an example process 300 for routing data transmissions via networks supporting different cellular technologies, from the perspective of a device.

Block 302 illustrates sending, from a device and to computing device(s) associated with a service provider, capabilities information associated with the device. In at least one example, the network management module 112 can send capabilities information (e.g., associated with the capabilities list 114 described below) to the service provider computing device(s) 104. In some examples, the network management module 112 can send capabilities information to the service provider computing device(s) 104 when the device 102 initiates a communication via the network(s) and/or after the device 102 moves from a first cell to a second cell in a network.

Block 304 illustrates receiving, from the computing device(s), service provider information associated with the service provider. Responsive to sending the capabilities information, the network management module 112 can receive, for instance from the service provider computing device(s) 104, an indication of cellular technologies supported by the service provider.

Block 306 illustrates determining to anchor the device to a first network of two or more networks available to the device, the two or more networks including a 4G cellular network and a 5G cellular network. In at least one example, multiple networks can be available to the device 102. The available networks can be determined based on capabilities information and service provider information described above.

In at least one example, the network management module 112 can determine which network, of the available networks, to anchor the device 102. As described above, network anchoring causes control and management flows associated with data transmissions to go through the network to which the device 102 is anchored. That is, when the network connectivity of the network to which the device 102 is anchored is lost, the device 102 may lose all services despite other network(s) that may be available to the device 102. In at least one example, a network management module 112 can anchor the device 102 in a particular cellular technology based on which cellular technology is supported by the service provider. As an example, if the device 102 supports both 4G technology and 5G technology, and the service provider primarily supports 5G technology, then the network management module 112 can determine to anchor the device 102 in 5G technology (e.g., the 5G cellular network 118). Or, if the device 102 supports both 4G technology and 5G technology, the network management module 112 can determine to anchor the device 102 in a highest performing cellular technology.

Block 308 illustrates determining whether the device is anchored to the 4G cellular network or the 5G cellular network. In addition to determining which cellular technology to anchor the device 102, the network management module 112 can determine whether to use other cellular technologies for individual services (e.g., data transmission(s) associated with particular application(s), etc.). As described above, the network management module 112 can leverage different mechanisms to determine how to route data transmissions based on which network the device 102 is anchored. Based on determining that the device 102 is anchored to the 4G cellular network, process 300 can proceed as described in FIG. 3B. Based on determining that the device 102 is anchored to the 5G cellular network, process 300 can proceed as described in FIG. 3C.

FIG. 3B illustrates routing data transmissions via networks supporting different cellular technologies when the device 102 is anchored in the 4G cellular network.

Block 310 illustrates analyzing, utilizing a scheduling algorithm, first characteristic(s) associated with the first network and second characteristic(s) associated with a second network of the two or more networks. In at least one example, the network management module 112 can determine characteristic(s) associated with the first network (e.g., to which the device 102 is anchored). For instance, the network management module 112 can determine the QoS associated with the first network. Additionally, in at least one example, the network management module 112 can determine characteristic(s) associated with the second network. For instance, the network management module 112 and/or the routing module 134 can determine the QoS associated with the second network.

When the device 102 is anchored in 4G technology (e.g., the 4G cellular network 116), the network management module 112 can determine which network to use for transmitting data based on a scheduling algorithm that considers characteristics of one or more available networks.

Block 312 illustrates determining, based at least partly on the first characteristic(s) and/or the second characteristic(s), whether the first network or the second network provides the best user experience. Based at least in part on analyzing the first characteristic(s) and/or the second characteristic(s) utilizing the scheduling algorithm, the network management module 112 can determine which of the networks is likely to provide the best user experience. Based on determining that the first network provides the best user experience, the network management module 112 can transmit a data transmission to the service provider computing device(s) 104 via the first network, as illustrated in block 314. Based on determining that the second network provides the best user experience, the network management module 112 can transmit a data transmission to the service provider computing device(s) 104 via the second network, as illustrated in block 316.

FIG. 3C illustrates routing data transmissions via networks supporting different cellular technologies when the device 102 is anchored in the 5G cellular network.

Block 318 illustrates determining whether a pre-provisioned routing rule is applicable to a data transmission. In at least one example, the device 102 can store pre-provisioned routing rules. The pre-provisioned routing rule(s) indicate through which network data associated with individual applications is to be routed. The pre-provisioned routing rule(s) can be updated as new application(s) are downloaded and/or otherwise associated with the device 102. In at least one example, the network management module 112 can analyze a data transmission to determine which application the data transmission is associated with. Then, the network management module 112 can perform a look-up, or other search, to determine whether any of the pre-provisioned routing rule(s) are associated with the application.

Based at least in part on determining that there is not a pre-provisioned routing rule that is applicable to the data transmission, the network management module 112 can transmit a data transmission to the service provider computing device(s) 104 via the first network or a second network of the two or more networks, as illustrated in block 320. In such an example, data associated with applications that are not identified in the pre-provisioned routing rule(s) can be evenly routed between the first network and the second network.

Based at least in part on determining that a pre-provisioned routing rule is applicable to the data transmission, the network management module 112 can transmit data to the service provider computing device(s) 104 based on the pre-provisioned routing rule, as illustrated in block 322. That is, if a pre-provisioned routing rule that is associated with the application indicates that data associated with the application is to be transmitted via the first network, the network management module 112 can transmit the data via the first network. Alternatively, if a pre-provisioned routing rule that is associated with the application indicates that data associated with the application is to be transmitted via the second network, the network management module 112 can transmit the data via the second network.

Block 324 illustrates determining, based at least partly on first characteristic(s) associated with the first network and/or second characteristic(s) associated with a second network of the two or more networks, a data flow associated with the first network and the second network. In at least one example, when the device 102 is anchored in 5G technology, the network management module 112 can determine characteristic(s) associated with each of the available network(s). For instance, the network management module 112 can determine the QoS associated with the first network and the QoS associated with the second network. The network management module 112 can analyze the first characteristic(s) and/or the second characteristic(s) to determine data flow associated with the first network and the second network.

Block 326 illustrates determining, based at least partly on the data flow, whether the first network or the second network provides the best user experience. For instance, the network management module 112 can analyze one or more characteristics associated with each of the available networks to determine which network is likely to provide the best user experience, and can route data through such network. In at least one example, the network management module 112 can perform deep packet inspection to determine how to route data via one or more available networks. Based on determining that the first network provides the best user experience, the network management module 112 can transmit a data transmission to the service provider computing device(s) 104 via the first network, as illustrated in block 328. Based on determining that the second network provides the best user experience, the network management module 112 can transmit a data transmission to the service provider computing device(s) 104 via the second network, as illustrated in block 330.

FIG. 4 illustrates an example process 400 for routing data transmissions via networks supporting different cellular technologies, from the perspective of one or more servers.

Block 402 illustrates receiving, at computing device(s) associated with a service provider and from a device, capabilities information associated with the device. In at least one example, the routing module 134 can receive capabilities information from the device 102. In some examples, as described above, the device 102 can send capabilities information to the service provider computing device(s) 104 when the device 102 initiates a communication via the network(s) and/or after the device 102 moves from a first cell to a second cell in one or more networks.

Block 404 illustrates sending, to the device, service provider information indicating cellular technologies supported by the service provider. Responsive to receiving the capabilities information, the routing module 134 can send an indication of cellular technologies supported by the service provider to the device 102.

Block 406 illustrates determining first characteristic(s) associated with a first network of the two or more networks that are available to the device, the two or more networks including a 4G cellular network and a 5G cellular network. In at least one example, the routing module 134 can determine characteristic(s) associated with the first network. For instance, the routing module 134 can determine the QoS associated with the first network.

Block 408 illustrates determining second characteristic(s) associated with a second network of the two or more networks that are available to the device. In at least one example, the routing module 134 can determine characteristic(s) associated with the second network. For instance, the routing module 134 can determine the QoS associated with the second network.

Block 410 illustrates determining, based at least partly on the first characteristic(s) and/or the second characteristic(s), whether the first network or the second network provides the best user experience. In at least one example, the routing module 134 can analyze characteristic(s) (e.g., based on the QoS) associated with each of the available network(s) to determine data flow associated with each of the available network(s). The routing module 134 can determine how to route data based on the analyzed data flow. For instance, routing module 134 can analyze relevant characteristic(s) associated with each of the available networks to determine which network is likely to provide the best user experience, and can route data through such network.

Based on determining that the first network provides the best user experience, the routing module 134 can transmit a data transmission to the device 102 via the first network, as illustrated in block 412. Based on determining that the second network provides the best user experience, the routing module 134 can transmit a data transmission to the device 102 via the second network, as illustrated in block 414.

Although the subject matter has been described in language specific to structural data items and/or methodological acts, it is to be understood that the subject matter defined in the appended claims is not necessarily limited to the specific data items or acts described. Rather, the specific data items and acts are disclosed as exemplary forms of implementing the claims.

What is claimed is:

1. A system comprising:
   one or more processors of a user equipment (UE); and
   one or more computer-readable media, of the UE, storing instructions executable by the one or more processors, wherein the instructions program the one or more processors of the UE to:
   determine that the UE moves from a first cell associated with two or more networks that are available to the UE to a second cell associated with the two or more networks;
   send, to one or more computing devices associated with a service provider and responsive to determining that the UE has moved from the first cell to the second cell, capabilities information associated with the UE including at least one of a UE-category, a feature group indicator, carrier aggregation band combination, or supported radio bands;
   determine, based at least in part on the capabilities information, the two or more networks that are available to the UE, the two or more networks including at least a fourth generation (4G) network and a fifth generation (5G) network;
   determine one or more first characteristics associated with a first network of the two or more networks, the UE being anchored in the first network;
   determine one or more second characteristics associated with a second network of the two or more networks;
   determine, based at least in part on the one or more first characteristics and the one or more second characteristics, to transmit data via the second network instead of the first network; and
   transmit the data via a second network.

2. The system as claim 1 recites, wherein the first network is the 4G network and the instructions program the one or more processors further to determine to transmit the data via the second network further based at least in part on a scheduling algorithm that analyzes the one or more first characteristics and the one or more second characteristics.

3. The system as claim 1 recites, wherein the first network is the 5G network and the instructions program the one or more processors further to:
   determine data flow associated with the two or more networks based at least in part on the one or more first characteristics and the one or more second characteristics; and determine to transmit the data via the second network based at least in part on the data flow.

4. The system as claim 1 recites, wherein the first network is the 4G network and the instructions program the one or more processors to determine to transmit the data via the second network further based at least in part on one or more pre-provisioned routing rules.

5. The system as claim 1 recites, wherein the one or more first characteristics or the one or more second characteristics are based at least in part on Quality of Service definitions associated with the first network and the second network.

6. The system as claim 1 recites, wherein the capabilities information comprises a capabilities list stored on the UE.

7. The system as claim 1 recites, the operations further comprising performing a deep packet inspection to determine packet behavior of a packet associated with the UE and determining to transmit the data via the second network based at least in part on the packet behavior.

8. A computer-implemented method performed by a device comprising:
    determining that the device moves from a first cell associated with two or more networks that are available to the device to a second cell associated with the two or more networks;
    sending, to one or more computing devices associated with a service provider and responsive to determining that the device has moved from the first cell to the second cell, capabilities information associated with a device including at least one of a UE-category, a feature group indicator, carrier aggregation band combination, or supported radio bands, the capabilities information indicating at least two radio bands supported by the device, the at least two radio bands being associated with fourth generation (4G) cellular technology and fifth generation (5G) cellular technology;
    determining, based at least in part on service provider information associated with the service provider and the capabilities information, to anchor the device in a first network of the two or more networks that are available to the device, the two or more networks including at least a 4G cellular network and a 5G cellular network;
    determining, by the device, one or more first characteristics associated with the first network of the two or more networks;
    determining, by the device, one or more second characteristics associated with a second network of the two or more networks; and
    routing, by the device, based at least partly on the one or more first characteristics and the one or more second characteristics, one or more data transmissions to the one or more computing devices via the first network or the second network.

9. The computer-implemented method as claim 8 recites, further comprising, responsive to sending the capabilities information, receiving, from the one or more computing devices, the service provider information, the service provider information indicating at least one or more cellular technologies supported by the service provider.

10. The computer-implemented method as claim 8 recites, wherein the first network is the 4G cellular network, and the computer-implemented method further comprises:
    analyzing, based at least in part on a scheduling algorithm, the one or more first characteristics and the one or more second characteristics;
    determining, based at least in part on analyzing the one or more first characteristics and the one or more second characteristics, that the second network is preferred over the first network; and
    determining to route a data transmission of the one or more data transmissions to the one or more computing devices via the second network instead of the first network.

11. The computer-implemented method as claim 8 recites, wherein the first network is the 5G cellular network, and the computer-implemented method further comprises:
    analyzing the one or more first characteristics and the one or more second characteristics to determine data flow associated with the first network and the second network;
    determining, based at least in part on the data flow, that the second network is preferred over the first network; and
    determining to route a data transmission of the one or more data transmissions to the one or more computing devices via the second network instead of the first network.

12. The computer-implemented method as claim 8 recites, wherein the first network is the 5G cellular network, and the computer-implemented method further comprises:
    retrieving one or more pre-provisioned routing rules;
    determining an application associated with a data transmission of the one or more data transmissions;
    determining that a pre-provisioned routing rule of the one or more pre-provisioned routing rules is associated with the application; and
    routing the data transmission to the one or more computing devices based at least in part on the pre-provisioned routing rule.

13. The computer-implemented method as claim 8 recites, wherein the first network is the 5G cellular network, and the computer-implemented method further comprises:
    retrieving one or more pre-provisioned routing rules;
    determining an application associated with a data transmission of the one or more data transmissions;
    determining that none of the one or more pre-provisioned routing rules are associated with the application; and
    routing the data transmission to the one or more computing devices via the first network or the second network, the routing of the data transmission based on an even distribution between the first network and the second network.

14. The computer-implemented method as claim 8 recites, wherein the one or more data transmissions are uplink data transmissions, and one or more downlink data transmissions are routed by a computing device of a base station associated with the service provider.

15. The computer-implemented method as claim 8 recites, wherein the one or more first characteristics and the one or more second characteristics are based at least in part on Quality of Service definitions associated with the first network and the second network.

16. A computer-implemented method comprising:
    receiving, from a device and in response to initiating a data transmission with the device as the device moves from a first cell to a second cell, capabilities information associated with the device, the capabilities information indicating at least two radio bands supported by the device, the at least two radio bands being associated with fourth generation (4G) cellular technology and fifth generation (5G) cellular technology;

determining one or more first characteristics associated with a first network of two or more networks that are available to the device, the two or more networks including at least a 4G cellular network and a 5G cellular network;

determining one or more second characteristics associated with a second network of the two or more networks;

determining, based at least in part on the one or more first characteristics and the one or more second characteristics, data flow associated with the two or more networks; and routing, based at least partly on the data flow associated with the two or more networks, one or more additional data transmissions to the device via a first network of the two or more networks and a second network of the two or more networks, the one or more additional data transmissions being evenly routed between the first network of the two or more networks and the second network of the two or more networks in response to determining the one or more additional data transmissions are associated with at least one application that is stored on the device and is unassociated with pre-provisioned routing rules.

17. The computer-implemented method as claim 16 recites, wherein the one or more additional data transmissions are downlink data transmissions, and one or more uplink data transmissions are routed by the device.

18. The computer-implemented method as claim 16 recites, wherein the one or more first characteristics and the one or more second characteristics are based at least in part on Quality of Service definitions associated with the first network and the second network.

19. The computer-implemented method as claim 16 recites, further comprising:
determining, based at least in part on the data flow, that the first network is associated with a better user experience than the second network; and
routing a data transmission of the one or more additional data transmissions via the first network instead of the second network.

20. The computer-implemented method as claim 16 recites, the method further comprising:
determining that the device is anchored in the 4G cellular technology or the 5G cellular technology;
in response to determining that the device is anchored in the 4G technology, utilizing a scheduling algorithm to route the one or more additional data transmissions; and
in response to determining that the device is anchored in the 5G technology, utilizing pre-provisioned routing rules to route the one or more additional data transmissions.

* * * * *